US012488140B2

(12) United States Patent
Wang

(10) Patent No.: US 12,488,140 B2
(45) Date of Patent: Dec. 2, 2025

(54) METHOD AND APPARATUS FOR PERFORMING HORIZONTAL FEDERATED LEARNING

(71) Applicant: SAMSUNG ELECTRONICS CO., LTD., Suwon-si (KR)

(72) Inventor: Chengjun Wang, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 17/939,665

(22) Filed: Sep. 7, 2022

(65) Prior Publication Data
US 2023/0073235 A1 Mar. 9, 2023

Related U.S. Application Data

(63) Continuation of application No. PCT/KR2022/006040, filed on Apr. 27, 2022.

(30) Foreign Application Priority Data

Sep. 7, 2021 (CN) .......................... 202111047500.7

(51) Int. Cl.
*G06F 21/62* (2013.01)
*G06N 20/20* (2019.01)

(52) U.S. Cl.
CPC ......... *G06F 21/6245* (2013.01); *G06N 20/20* (2019.01)

(58) Field of Classification Search
CPC ........ G06N 3/08; G06N 3/0475; G06N 20/00; G06N 21/6245; G06N 3/098;
(Continued)

(56) References Cited

U.S. PATENT DOCUMENTS 10,579,814 B2 3/2020 Ben-Yair et al.
10,657,461 B2 5/2020 McMahan et al.
(Continued)

FOREIGN PATENT DOCUMENTS

CN 111625820 A 9/2020
CN 112860441 A 5/2021
(Continued)

OTHER PUBLICATIONS

"TensorFlow Federated: Machine Learning on Decentralized Data", https://www.tensorflow.org/federated, 2021, (10 pages total).
(Continued)

*Primary Examiner* — Dustin Nguyen
(74) *Attorney, Agent, or Firm* — Sughrue Mion, PLLC

(57) ABSTRACT

The present disclosure discloses a method for federated learning, including: requesting, by a target application, a user to provide a federated learning data access right to access privacy data; calling, by the target application, a unified federated learning service (UnifiedFED) application to perform horizontal federated learning, acquiring, by the UnifiedFED application, the privacy data isolated from the target application according to the federated learning data access right, receiving, by the UnifiedFED application, non-privacy data from the target application, and providing, by the UnifiedFED application, the privacy data and the non-privacy data to an artificial intelligence (AI) model for federated learning training.

20 Claims, 14 Drawing Sheets

(58) Field of Classification Search
CPC .... G06N 3/0985; G06N 20/20; H04L 9/3066; H04L 41/16; H04W 36/0083; H04W 4/029; G06F 16/901; G06F 18/248; G06F 21/6227

See application file for complete search history.

(56) References Cited

U.S. PATENT DOCUMENTS

| | | | |
|---|---|---|---|
| 11,017,322 B1 | 5/2021 | Du et al. | |
| 11,500,929 B2 | 11/2022 | Choudhury et al. | |
| 11,552,785 B2* | 1/2023 | Stephenson | H04L 9/3066 |
| 2010/0186066 A1 | 7/2010 | Pollard | |
| 2019/0050749 A1* | 2/2019 | Sanketi | G06N 20/00 |
| 2020/0380155 A1 | 12/2020 | Sarferaz | |
| 2020/0380164 A1 | 12/2020 | Yoho et al. | |
| 2021/0097439 A1 | 4/2021 | Vodencarevic et al. | |
| 2021/0142223 A1* | 5/2021 | Choudhury | G06F 16/901 |
| 2021/0256309 A1* | 8/2021 | Huth | G06F 18/2148 |
| 2021/0374617 A1* | 12/2021 | Chu | G06N 20/20 |
| 2022/0303736 A1* | 9/2022 | Glover | H04W 4/029 |
| 2022/0374544 A1* | 11/2022 | Polychroniadou | G06F 21/6245 |
| 2023/0050708 A1* | 2/2023 | Watanabe | G06N 3/08 |
| 2023/0065937 A1* | 3/2023 | Satheesh Kumar | G06N 20/00 |
| 2023/0116117 A1* | 4/2023 | Shao | G06N 3/0475 706/25 |
| 2023/0162047 A1* | 5/2023 | Mortazavi | G06N 3/08 706/15 |
| 2023/0267326 A1* | 8/2023 | Jiang | G06N 3/08 706/25 |
| 2023/0297844 A1* | 9/2023 | Satheesh Kumar | G06N 3/098 706/20 |
| 2023/0342491 A1* | 10/2023 | Gilmore | G06F 21/6227 |
| 2024/0155714 A1* | 5/2024 | Rydén | H04W 36/0083 |
| 2024/0281719 A1* | 8/2024 | Duan | H04L 41/16 |
| 2024/0394556 A1* | 11/2024 | Shao | G06N 3/0985 |

FOREIGN PATENT DOCUMENTS

| | | |
|---|---|---|
| CN | 113094181 A | 7/2021 |
| CN | 113222175 A | 8/2021 |
| WO | 2020/029585 A1 | 2/2020 |
| WO | 2020/168761 A1 | 8/2020 |
| WO | 2021/032495 A1 | 2/2021 |

OTHER PUBLICATIONS

WWDC2019, https://developer.apple.com/videos/play/wwdc2019/708, Jul. 2019.

"IEEE Guide for Architectural Framework and Application of Federated Machine Learning", IEEE Standards Association, https://standards.ieee.org/standard/3652_1-2020.html, 2021, (5 pages total).

Federated Learning of Cohorts, Wikipedia, https://en.wikipedia.org/wiki/Federated_Learning_of_Cohorts, 2021, (4 pages total).

Eric Grindley, "Google's Antitrust Suit is a Harbinger of Rough Waters for Apple's IDFA Changes", Nov. 16, 2020, https://martech.zone/googles-antitrust-suit-apples-idfa/, Nov. 2020, (1 page total).

Notice on printing and distributing the Provisions on the Scope of Personal Information Necessary for Common Types of Mobile Internet Applications, China Netinfo, Mar. 2021, http://www.cac.gov.cn/2021-03/22/c_1617990997054277.htm, (10 pages total).

"App Store Review Guidelines", Apple Inc., https://developer.apple.com/app-store/review/guidelines/, 2021, (24 pages total).

Yang et al., "Federated Machine Learning: Concept and Applications", ACM Trans. Intell. Syst. Technol., vol. 10, No. 2, Article 12, Feb. 13, 2019, arXiv:1902.04885v1 [cs.AI], (19 pages total).

Scannapieco et al., "Privacy preserving schema and data matching", 2007 ACM SIGMOD international conference on Management of data, Jun. 2007, https://doi.org/10.1145/1247480.1247553, (4 pages total).

Kang et al., "Incentive Design for Efficient Federated Learning in Mobile Networks: A Contract Theory Approach", Oct. 24, 2019, arXiv:1905.07479v2 [cs.LG], (6 pages total).

Zhan et al., "A Learning-based Incentive Mechanism for Federated Learning", Jul. 7, 2020, https://www.u-aizu.ac.jp/~pengli/files/fl_incentive_iot.pdf, (9 pages total).

Chen Caixian, "Economic Incentives in Federated Learning", CCF-GAIR 2020, Sep. 2020, https://www.leiphone.com/category/academic/QNQZbT0VsGBinsnf.html, (18 total pages).

Kairouz et al., "Advances and Open Problems in Federated Learning", Mar. 9, 2021, arXiv:1912.04977v3 [cs.LG], (121 total pages).

International Search Report (PCT/ISA/210, PCT/ISA/220 and PCT/ISA/237) and Written Opinion (PCT/ISA/220) dated Aug. 1, 2022 issued by the International Searching Authority in International Application No. PCT/KR2022/006040.

Communication issued on Sep. 21, 2024 from the China National Intellectual Property Administration for Chinese Patent Application No. 202111047500.7.

* cited by examiner

METHOD AND APPARATUS FOR PERFORMING HORIZONTAL FEDERATED LEARNING

CROSS-REFERENCE TO RELATED APPLICATION

This application is a bypass continuation application which claims priority to an International Application No. PCT/KR2022/006040 filed on Apr. 27, 2022, which claims priority to Chinese Patent Application No. 202111047500.7, filed on Sep. 7, 2021 in the Chinese Patent Office, the disclosures of which are incorporated herein by reference in their entireties.

BACKGROUND

1. Field

The present disclosure relates to an apparatus and a method for providing privacy protection, and more particularly, relates to a method and an apparatus for providing privacy protection using an enhanced horizontal federated machine learning technique.

2. Description of Related Art

With the development of the Internet and the popularization of terminal devices such as mobile phones and the Internet of things (IOTs), people enjoy the convenience in modern life while user data is acquired by various applications, resulting in increasingly serious concerns of privacy leakage. In the era of big data, many applications train their artificial intelligence (AI) models to optimize services depending on a large number of various user data. Some of the user data are essential for the applications to provide services, and some are non-essential. The user data essential for the applications can also be processed locally without being uploaded to a cloud server since they sometimes involve user privacy.

In order to control and solve the problem of privacy leakage, the government has formulated stricter regulations (such as General Data Protection Regulation (GPDR)) for protecting privacy. People are also developing new methods to protect the user privacy while training and applying the AI models by using the user data. Under such a background, federated learning has come into existence.

The technique of federated learning includes the following key points: 1. a global model; and 2. saving user data locally and securely. For example, there is no need to upload the content input by a user using a keyboard to a server, and a model can be trained and predicted locally by a distributed service.

Federated learning is also known as collaborative learning or allied learning. The federated learning is a machine learning framework, which can effectively help many organizations to use data and perform machine learning modeling under the premise of meeting the requirements of user's privacy protection, data safety and government regulations. Each party in the federated learning does not directly exchange data, so that the user privacy can be protected to a large extent.

SUMMARY

According to an aspect of the present disclosure, a method for performing federated learning may include: requesting, by a target application, a user to provide a federated learning data access right to access privacy data: calling, by the target application, a unified federated learning service (UnifiedFED) application to perform federated learning, acquiring, by the UnifiedFED application, the privacy data isolated from the target application according to the federated learning data access right, receiving, by the UnifiedFED application, non-privacy data from the target application, and providing, by the UnifiedFED application, the privacy data and the non-privacy data to an artificial intelligence (AI) model for federated learning training.

In an embodiment, wherein the acquiring of the privacy data comprises: in response to the target application about the federated learning data access right, identifying type of the federated learning data access right; and acquiring the privacy data based on the identified type.

In an embodiment, the method further comprises: identifying the type of the federated learning data access right as being allowed to have the federated learning data access right only at a current time; and acquiring the privacy data based on the identified type.

In an embodiment, the method further comprises: identifying the type of the federated learning data access right as being allowed to have the federated learning data access at all times, authorizing the federated learning data access right to the target application, and acquiring the privacy data based on the identified type.

In an embodiment, the method further comprises: identifying the type of the federated learning data access right as not being allowed to have the federated learning data access at all times; and rejecting the target application to obtain the federated learning data access right.

In an embodiment, the method further comprises: acquiring, by the UnifiedFED application, self-owned data of the target application, and preprocessing the data based on a user setting and a parameter that is transmitted when the target application calls the UnifiedFED application to acquire the preprocessed data that is input into the AI model.

In an embodiment, the method further comprises: determining, by the UnifiedFED application, schedules of the federated learning training as executing a task of the federated learning training immediately: when a current device status meets a condition notifying the target application that model training can be performed, notifying a cloud server by the target application that the model training can be performed on a local device, and downloading the model when the local device is chosen by the cloud server or in advance; and when the current device status does not meet the condition notifying the target application that a request for the federated learning data access right is rejected, and notifying, by the target application, the cloud server to choose another device to perform the model training.

In an embodiment, the method further comprises: determining, by the UnifiedFED application, schedules of the federated learning training as executing a task of the federated learning training asynchronously: periodically checking the current device status, when the current device status meets the condition, notifying the target application that the model training can be performed, notifying the cloud server by the target application that the model training can be performed on the local device, and downloading the model when the local device is chosen by the cloud server or in advance.

In an embodiment, the UnifiedFED application determines if the current device status meets the condition based on at least one of a task type, a model size, a number of neural network parameters to be trained, a service condition of a processor, a battery, or a network of a device that performs the method, a data volume to be trained, and a user setting, wherein the task type comprises a predicting task and a training task, with the predicting task having a priority level higher than that of the training task; and the model size, the number of neural network parameters to be trained, and the data volume to be trained are used to estimate a time required for training.

In an embodiment, the method further comprises: transmitting, by the UnifiedFED application, a gradient to the cloud server; and receiving, by the UnifiedFED application, updated AI model from the cloud server.

According to an aspect of the present disclosure, an apparatus for federated learning, the apparatus comprising: a memory storing one or more instructions; and at least one processor configured to execute the one or more instructions to: determine, when receiving scheduling from a target application, if the target application has a federated learning data access right to access privacy data; and in response to determining that the target application has the federated learning data access right to access the privacy data, acquire the privacy data that is isolated from the target application, receive non-privacy data from the target application, and provide the privacy data and the non-privacy data to an artificial intelligence (AI) model to perform federated learning training.

In an embodiment, the at least one processor is further configured to execute the one or more instructions to: in response to the target application about the federated learning data access right, identify type of the federated learning data access right; and acquire the privacy data based on the identified type.

In an embodiment, the at least one processor is further configured to identify the type of the federated learning data access right as being allowed to have the federated learning data access right only at a current time; and acquiring the privacy data based on the identified type.

In an embodiment, the at least one processor is further configured to identify the type of the federated learning data access right as being allowed to have the federated learning data access at all times, authorizing the federated learning data access right to the target application, and acquire the privacy data based on the identified type.

In an embodiment, the at least one processor is further configured to identify the type of the federated learning data access right as not being allowed to have the federated learning data access at all times; and reject the target application to obtain the federated learning data access right.

In an embodiment, the at least one processor is further configured to preprocess user data based on a user configuration and a parameter that are transmitted when the target application calls a unified federated learning service (UnifiedFED) application to acquire the preprocessed data that is input into the AI model, and the user data comprises the privacy data and self-owned data of the target application.

In an embodiment, the at least one processor is further configured to: determine schedules of the federated learning training as executing a task of the federated learning training asynchronously; periodically check the current device status; and when the current device status meets the condition, notify the target application that the model training can be performed, and download the model when the local device is chosen by the cloud server or in advance.

According to an aspect of the present disclosure, a computer-readable storage medium, having a computer program stored thereon that performs, when executed by a processor, the method according to any one of the above methods.

In an embodiment, a computer-readable storage medium, having a computer program stored thereon that performs, when executed by a processor, the method comprising: requesting, by a target application, a user to provide a federated learning data access right to access privacy data: calling, by the target application, a unified federated learning service (UnifiedFED) application to perform federated learning, acquiring, by the UnifiedFED application, the privacy data isolated from the target application according to the federated learning data access right, receiving, by the UnifiedFED application, non-privacy data from the target application, and providing, by the UnifiedFED application, the privacy data and the non-privacy data to an artificial intelligence (AI) model for federated learning training.

In an embodiment, a computer-readable storage medium, having a computer program stored thereon that performs, when executed by a processor, the method comprises: in response to the target application about the federated learning data access right, identifying type of the federated learning data access right; and acquiring the privacy data based on the identified type.

In an embodiment, a computer-readable storage medium, having a computer program stored thereon that performs, when executed by a processor, the method further comprises: acquiring, by the UnifiedFED application, self-owned data of the target application, and preprocessing the data based on a user setting and a parameter that is transmitted when the target application calls the UnifiedFED application to acquire the preprocessed data that is input into the AI model.

DETAILED DESCRIPTION

Figure 1:
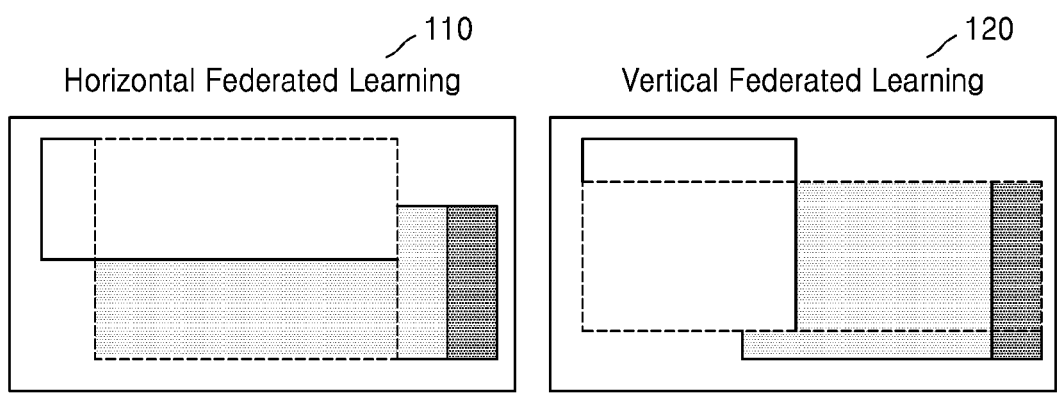
FIG. 1 is a schematic diagram of the classification of federated learning technologies.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The federated learning may be classified into horizontal federated learning, vertical federated learning, and federated transfer learning etc. FIG. 1 is a schematic diagram of the classification of the federated learning technology. Referring to FIG. 1, the three types of federated learning technologies will be respectively illustrated below.

I. Horizontal Federated Learning 110

(1) Learning Process a. Participants each download the latest model from a server A;

b. Each of the participants trains the model by using local data, encrypts a gradient, and uploads the gradient to the server A, which then aggregates the gradients from users to update the parameters of the model;

c. The server A returns the updated model to each of the participants; and d. The participants update their models respectively.

(2) Predicting Process

Each machine has the same and complete model, and can perform independent prediction during the predicting.

II. Vertical federated learning 120

Figure 2:
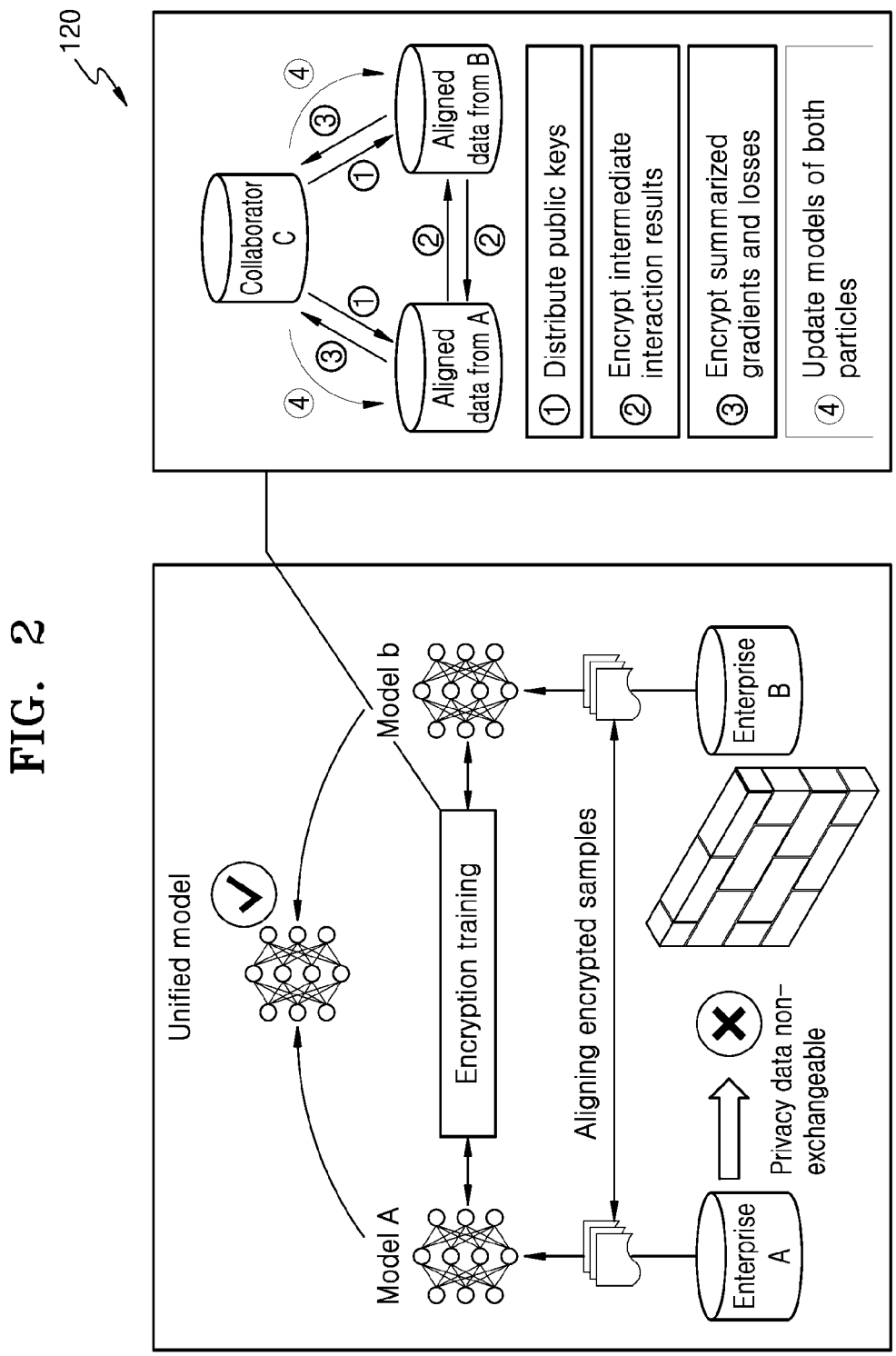
FIG. 2 is a schematic diagram of the principle of vertical federated learning.

FIG. 2 is a schematic diagram of the principle of the vertical federated learning 120, which will be illustrated in conjunction with FIG. 2. In FIG. 2, Enterprise A, Enterprise B, and Collaborator C may represents a server A, a server B, and a server B that are operated by Enterprise A, Enterprise B, and Collaborator C, respectively.

(1) Learning Process a. Samples are encrypted and aligned at a system level, such that non-crossed users are not exposed at an enterprise perception level (for example, an enterprise A and an enterprise B as shown);

b. A third party (a collaborator C as shown in FIG. 2) distributes public keys to Enterprise A and Enterprise B to encrypt data to be transmitted;

c. Enterprise A and Enterprise B respectively calculate intermediate results of their related features, and encrypt and exchange the intermediate results to solve their gradients and losses;

d. Enterprise A and Enterprise B respectively calculate their encrypted gradients, add masks to the gradients, and send the gradients to Collaborator C respectively, and meanwhile, Enterprise A and Enterprise B calculate encrypted losses and send the losses to Collaborator C; and e. Collaborator C decrypts the gradients and losses and returns the decrypted gradients and losses to Enterprise A and Enterprise B, and Enterprise A and Enterprise B remove the masks and update a model predicting process.

(2) Predicting Process

The predicting needs to be completed under the collaboration of both parties since they can only obtain their related model parameters.

In the related art, an application is not completely isolated from data in the federated learning on devices such as mobile phones or IoT devices. It is specifically reflected in the following:

(1) The application can still access the user data by requesting for a corresponding data right. (2) The application depends on self-restriction and is subject to privacy regulations, such that it processes the user privacy data locally without uploading the user privacy data. (3) How the application uses the data is not transparent. A user knows that the application possesses the data, but has no idea on how the application uses the data. This objectively hinders the right of the application for acquiring some user information. For example, an e-commerce application requests to read the address book of a user, which is likely to be denied by the user.

In the era when big data and AI algorithms are popular, applications have an infinite desire for the user data, but are not allowed to acquire non-essential data limitlessly due to the privacy regulations and the acceptance level of the users. As a result, the two objectives for protecting privacy and using privacy data are in conflict with each other. Therefore, there is a need to find a solution to allow the application to obtain a good AI model without acquiring the user data.

Federated learning tasks involve a large number of calculations, and consume a large amount of central processing unit (CPU) and graphic processing unit (GPU) resources, and also a large amount of power. In addition, in consideration of the possibility of running a plurality of federated learning tasks on a device simultaneously, the device needs a unified system-level service to optimize and manage all the tasks.

In order to solve the problems, the present application provides, based on the existing horizontal federated learning technology, a new technical solution, which is referred to as a unified federated learning service in the subsequent description, with the technical focuses as follows.

1. A new data access right specific to the federated learning, namely, a federated learning data access right, is set.

The federated learning data access right is different from a common data access right in that an application may request the federated learning data access right. Under the common data access right, the data is directly provided to the application; and under the federated learning data access right, the data access and model interaction are completed by UnifiedFED (e.g., a UnifiedFED application, a UnifiedFED system, and/or an UnifiedFED model configured to perform a data access right management process), and the application cannot acquire the content of the data. With this method, the application can be isolated from the user data. Therefore, with respect to user privacy data, a user can authorize this right to the application, thereby ensuring the application to be isolated from the user privacy data and improving the security in using the user privacy data.

2. "Enhanced Horizontal Federated Learning" is realized based on the federated learning data access right.

With the federated learning data access right, the UnifiedFED may acquire the user privacy data, so that new features of the user (i.e., the user privacy data) can be introduced for training based on the horizontal federated learning, thereby implementing an enhanced horizontal federated learning technology. This technology has both the advantages of the horizontal federated learning and the advantage of feature combination of the vertical federated learning.

3. By performing scheduling management on the request from the application, the requests from a plurality of different applications can be scheduled based on a user setting and a service condition of a CPU, a GPU, a battery, and/or a network, thereby achieving higher intelligence and better economy in power consumption.

4. Since the applications cannot directly access and modify the data, a system according to an embodiment according to the present disclosure defines some common data preprocessing functions to enable the preprocessing of the data for training or predicting the model.

5. An incentive mechanism is introduced to encourage a user to participate in model training, to reasonably evaluate the contribution of each participant, and to provide an incentive in a certain form.

The feasibility of the above technical solutions according to embodiments of the present disclosure is demonstrated as follows: if the horizontal federated learning and the vertical federated learning can ensure the security of user data without violating the privacy regulations, the enhanced horizontal federated learning of the present disclosure in most cases satisfies the condition of ensuring the security of user data without violating the privacy regulations. Specifically, (1) The enhanced horizontal federated learning according to embodiments of the present disclosure uses the same framework in a Common Federated Learning Frame layer as the horizontal federated learning to ensure the security of data;

(2) If the user data acquired by an enterprise can be used to train an AI model in cooperation with other enterprises by the vertical federated learning without violating the user privacy regulations, the UnifiedFED that directly requests a user to provide the "federated learning data access right" does not violate the privacy regulations either; and (3) Embodiments according to the present disclosure are different from the conventional horizontal federated learning in that the user privacy data is introduced and added to the training. Ensuring the security of the data is only required. The present embodiments may strictly isolate the applications from the user privacy data by the UnifiedFED, by which data feeding, training and predicting are all completed for the AI model.

The technical focuses and feasibility of the technical solutions of the present application are illustrated above. The specific embodiments of the technical solutions of the present application will be further illustrated in detail below in conjunction with accompanying drawings.

Figure 3A:
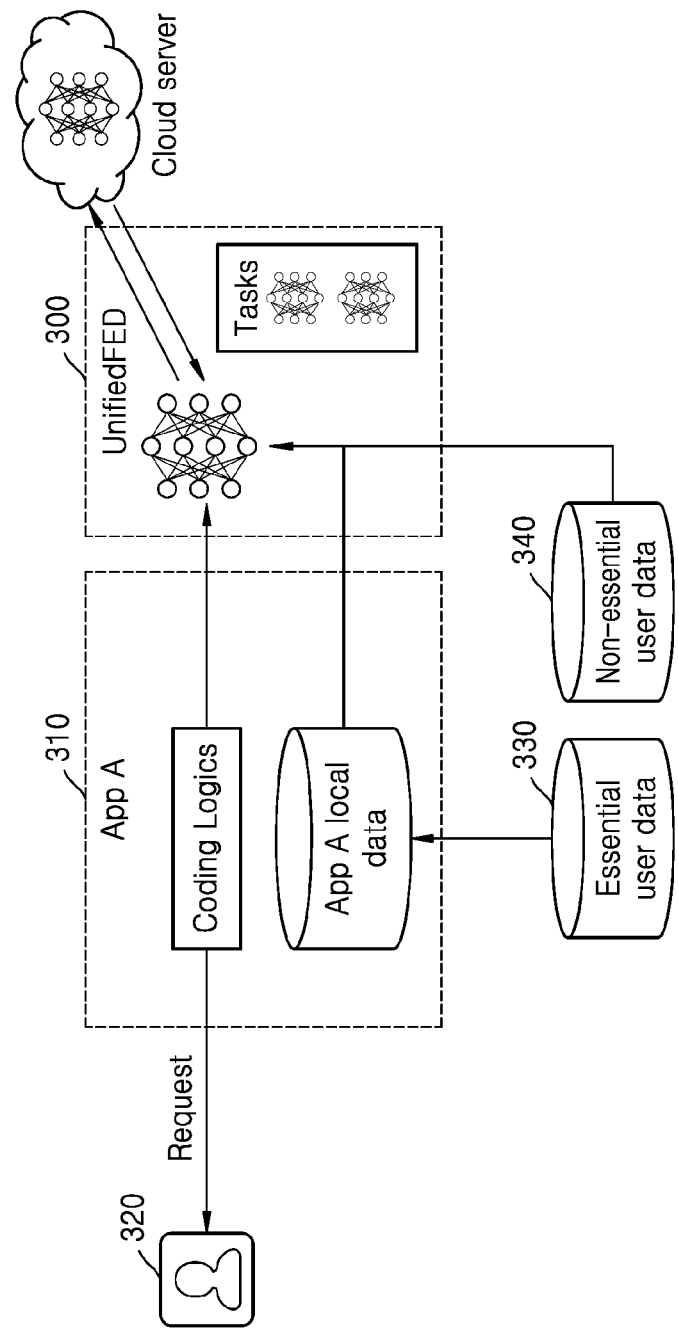
FIG. 3A is a schematic diagram of the principle of an enhanced horizontal federated learning technology according to an embodiment of the present disclosure.

FIG. 3A is a schematic diagram of the principle of an enhanced horizontal federated learning technology according to the present application.

Based on horizontally federated learning and newly-designed user permissions, this method introduce new features to train AI model while keep data unknown to the application to meet regulations, which have advantages in vertically federated learning called feature combination.

Referring to FIG. 3, a code logic of an application (for example, application A 310 as shown) may request a user 320 to provide an ordinary data access right to access essential user data 330 and a federated learning data access right to access non-essential user data 340. The non-essential user data 340 may correspond to the user privacy data. The essential user data 330 may correspond to the user's non-privacy data. The application A 310 may apply to user 320 about essential data 330 usage permission and non-essential data federated learning rights.

Essential user data may be directly accessed by the application. The non-essential user data 340 (also called non-essential data only for federated learning as shown) is isolated from the application A 310, which calls UnifiedFED 300. The non-essential user data 340 (also referred as an user's privacy data) is directly transmitted to the UnifiedFED 300 without going through the application. Under the federated learning data access right, the non-essential user data 340 is isolated from the application A 310.

The UnifiedFED 300 may also receive the essential user data 330 sent by the application. The UnifiedFED 300 may provide the acquired non-essential and/or essential user data to a model for horizontal federated learning training. A system according to embodiments of the present disclosure may classify non-essential data and essential user data based on predetermined data labels. The UnifiedFED 300 may schedule a plurality of federated learning tasks based on the device status and the user setting, may predefine some data preprocessing functions to enable the preprocessing of the data, and may introduce a user incentive mechanism. Main difference between before and after an embodiment of the present disclosure is whether user's privacy data is isolated from application A.

Figure 3B:
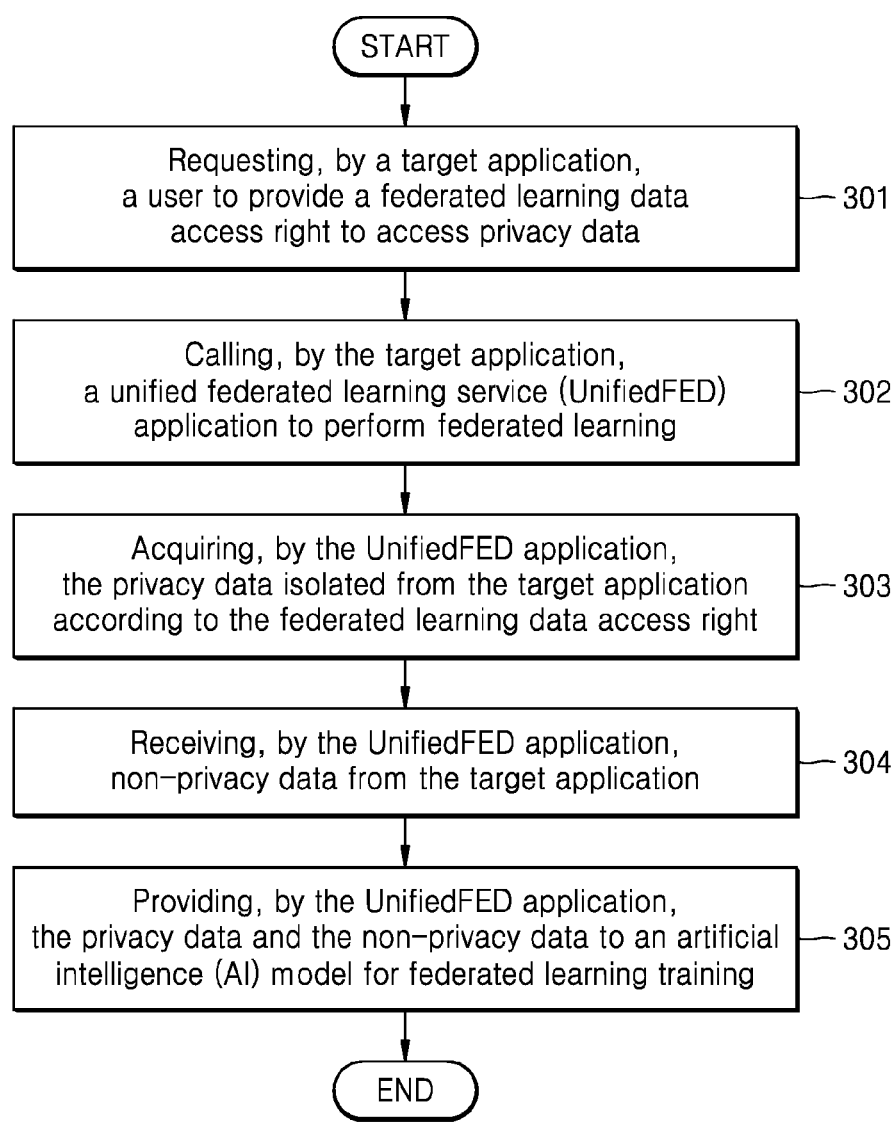
FIG. 3B is a flowchart illustrating a method of performing federated learning according to an embodiment of the present disclosure.

FIG. 3B is a flowchart illustrating a method of performing federated learning according to an embodiment of the present disclosure At Operation 301, a target application may request a user to provide a federated learning data access right to access privacy data. At Operation 302, the target application may call a UnifiedFED application to perform horizontal federated learning.

At Operation 303, the UnifiedFED application may acquire the privacy data isolated from the target application according to the federated learning data access right. The acquiring of the privacy data comprises: in response to the target application about the federated learning data access right, identifying type of the federated learning data access right; and acquiring the privacy data based on the identified type. The method further comprises: identifying the type of the federated learning data access right as being allowed to have the federated learning data access right only at a current time; and acquiring the privacy data based on the identified type. The method further comprises: identifying the type of the federated learning data access right as being allowed to have the federated learning data access at all times, authorizing the federated learning data access right to the target application, and acquiring the privacy data based on the identified type. The method further comprises: identifying the type of the federated learning data access right as not being allowed to have the federated learning data access at all times; and rejecting the target application to obtain the federated learning data access right.

At Operation 304, the UnifiedFED application may receive non-privacy data from the target application. At Operation 305, the UnifiedFED application may provide the privacy data and the non-privacy data to an artificial intelligence (AI) model for horizontal federated learning training.

In an embodiment, the method further comprises: acquiring, by the UnifiedFED application, self-owned data of the target application, and preprocessing the data based on a user setting and a parameter that is transmitted when the target application calls the UnifiedFED application to acquire the preprocessed data that is input into the AI model.

In an embodiment, the method further comprises: determining, by the UnifiedFED application, schedules of the federated learning training as executing a task of the federated learning training immediately: when a current device status meets a condition notifying the target application that model training can be performed, notifying a cloud server by the target application that the model training can be performed on a local device, and downloading the model when the local device is chosen by the cloud server or in advance; and when the current device status does not meet the condition notifying the target application that a request for the federated learning data access right is rejected, and notifying, by the target application, the cloud server to choose another device to perform the model training.

In an embodiment, the method further comprises: determining, by the UnifiedFED application, schedules of the federated learning training as executing a task of the federated learning training asynchronously: periodically checking the current device status, when the current device status meets the condition, notifying the target application that the model training can be performed, notifying the cloud server by the target application that the model training can be performed on the local device, and downloading the model when the local device is chosen by the cloud server or in advance.

In an embodiment, the UnifiedFED application determines if the current device status meets the condition based on at least one of a task type, a model size, a number of neural network parameters to be trained, a service condition of a processor, a battery, or a network of a device that performs the method, a data volume to be trained, and a user setting, wherein the task type comprises a predicting task and a training task, with the predicting task having a priority level higher than that of the training task; and the model size, the number of neural network parameters to be trained, and the data volume to be trained are used to estimate a time required for training.

In an embodiment, the method further comprises: transmitting, by the UnifiedFED application, a gradient to the cloud server; and receiving, by the UnifiedFED application, updated AI model from the cloud server.

Figure 4A:
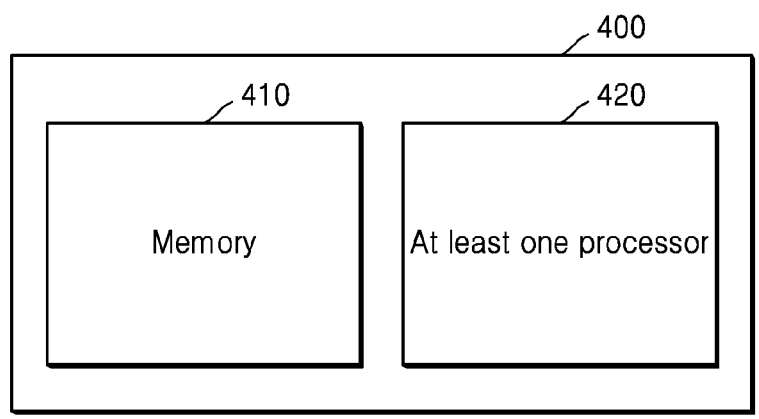
FIG. 4A is a schematic diagram of component modules of an apparatus for horizontal federated learning according to an embodiment of the present disclosure.

FIG. 4A is a schematic diagram of component modules of an apparatus for performing horizontal federated learning according to an embodiment of the present disclosure. The apparatus 400 for performing horizontal federated learning may comprises the memory 410 and the at least one processor 420.

The memory 410 may include a volatile and/or non-volatile memory. The memory 410 stores information, such as one or more of commands, data, programs (one or more instructions), which are related to at least one other component of apparatus 400 and for driving and controlling apparatus 400.

The at least one processor 420 includes one or more of a central processing unit (CPU), a graphics processor unit (GPU), an accelerated processing unit (APU), a many integrated core (MIC), a field-programmable gate array (FPGA), or a digital signal processor (DSP). The at least one processor 420 is able to perform control of any one or any combination of the other components of the apparatus 400, and/or perform an operation or data processing relating to communication. For example, the at least one processor 420 performs a unified federated learning service and a horizontal federated learning process according to embodiments of the present disclosure.

The apparatus 400 for enhanced horizontal federated learning, the apparatus 400 comprising: the memory 410 storing one or more instructions; and the at least one processor 420 configured to execute the one or more instructions to: determine, when receiving scheduling from a target application, if the target application has a federated learning data access right to access privacy data; and in response to determining that the target application has the federated learning data access right to access the privacy data, acquire the privacy data that is isolated from the target application, receive non-privacy data from the target application, and provide the privacy data and the non-privacy data to an artificial intelligence (AI) model via a federated learning framework layer interface to perform horizontal federated learning training.

Figure 4B:
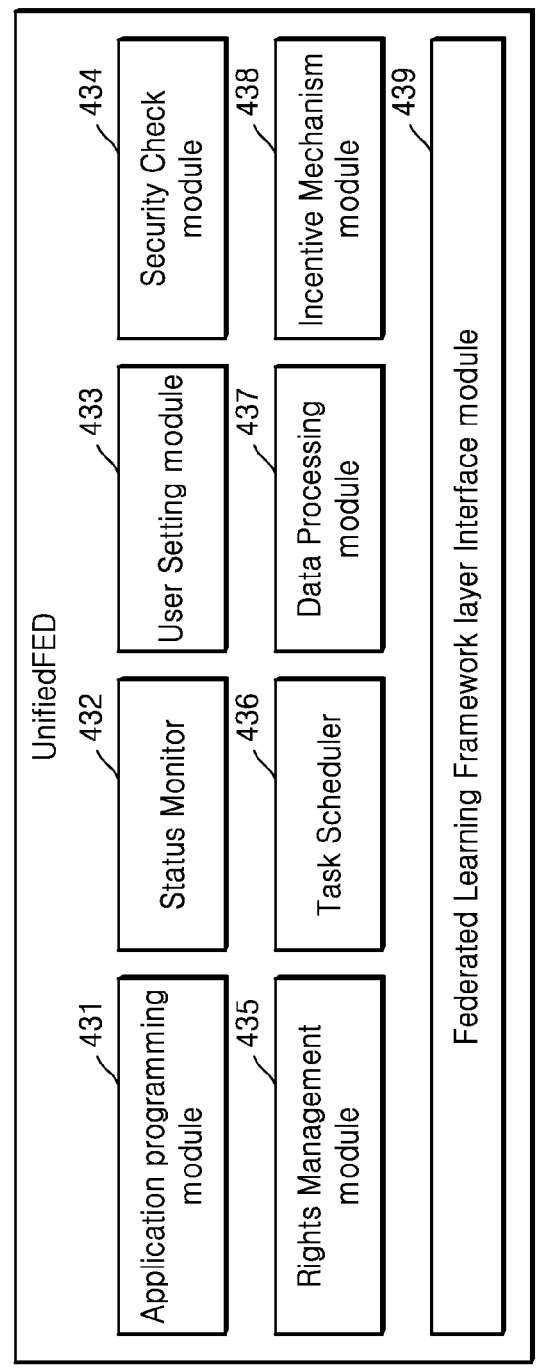
FIG. 4B is another schematic diagram of component modules of an apparatus for horizontal federated learning according to an embodiment of the present disclosure.

FIG. 4B is another schematic diagram of component modules of the apparatus for Horizontal Federated Learning according to embodiments of the present disclosure.

The apparatus 400 is deployed based on a Common Federated Learning Framework, and may include the following modules: an Application programming interface module 431, a Status Monitor 432, a User Setting module 433, a Security Check module 434, a Right Management module 435, a Task Scheduler 436, a Data Preprocessing module 437, an Incentive Mechanism module 438, and a Federated Learning Framework Layer Interface module 439. The modules are illustrated below in conjunction with the accompanying drawings.

Figure 5:
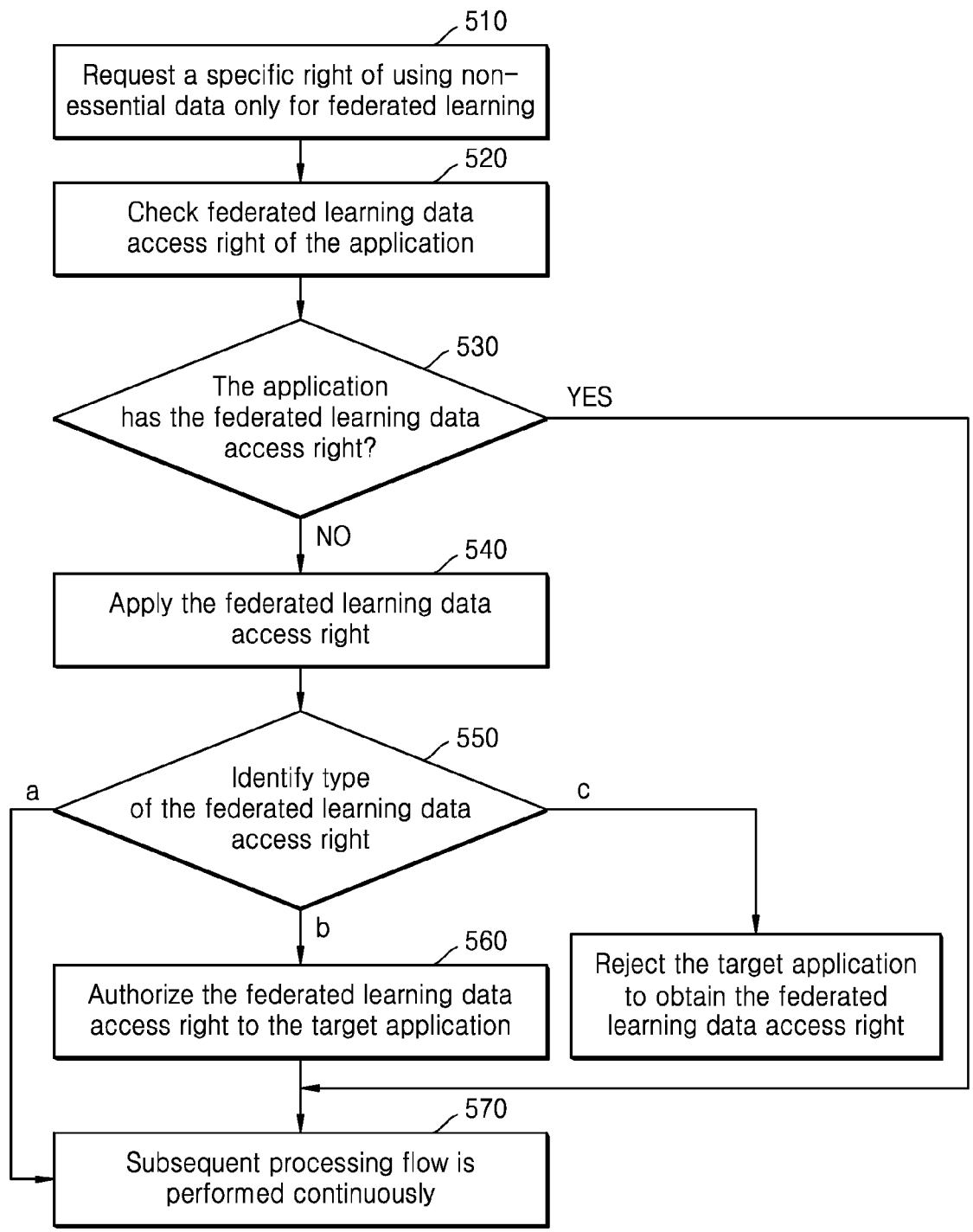
FIG. 5 is a schematic diagram of a process of performing right management by a preferred right management module according to an embodiment of the present disclosure.

FIG. 5 is a schematic diagram of a process of performing right management by right management module 435 according to embodiments of the present disclosure. Referring to FIG. 5, the following steps are included in the process of performing right management by right management module 435.

In operation 510, an application calls a UnifiedFED, and requests a specific right of using non-essential data only for federated learning (also referred as federated learning data access right), i.e., the non-essential user data/user privacy data as previously described.

In Operation 520, the federated learning data access right of the application is checked.

The acquiring of the privacy data comprises in response to the target application about the federated learning data access right, identifying type of the federated learning data access right; and acquiring the privacy data based on the identified type.

In operation 530, whether the application has the federated learning data access right, when the application has the federated learning data access right, the right management process proceeds to Step 570, and otherwise, proceeds to Step 540.

In Operation 540, the federated learning data access right may be applied to the application. When the application has the federated learning data access right, the federated learning data access right may be applied to the application.

In an embodiment, the acquiring of the privacy data comprises in response to the target application about the federated learning data access right, identifying type of the federated learning data access right; and acquiring the privacy data based on the identified type.

In Operation 550, under the request of the specific right of using non-essential data only for federated learning, a user may select one option of (a) allowing the federated learning data access right only at the current moment, (b) always allowing the federated learning data access right and (c) not allowing the federated learning data access right.

When a user selects option (a) of allowing the right only at the current moment, the right management process proceeds operation 570. When the user selects option (b) of always allowing the right, Operation 560 is performed continuously. In Operation 560, the federated learning data access right is given to the application, and a corresponding record is added in the right management module 435. When the user selects option (c) of not allowing the right, authorizing the right is rejected, and the process is ended. In Operation 570, the subsequent processing flow is performed continuously.

Figure 6:
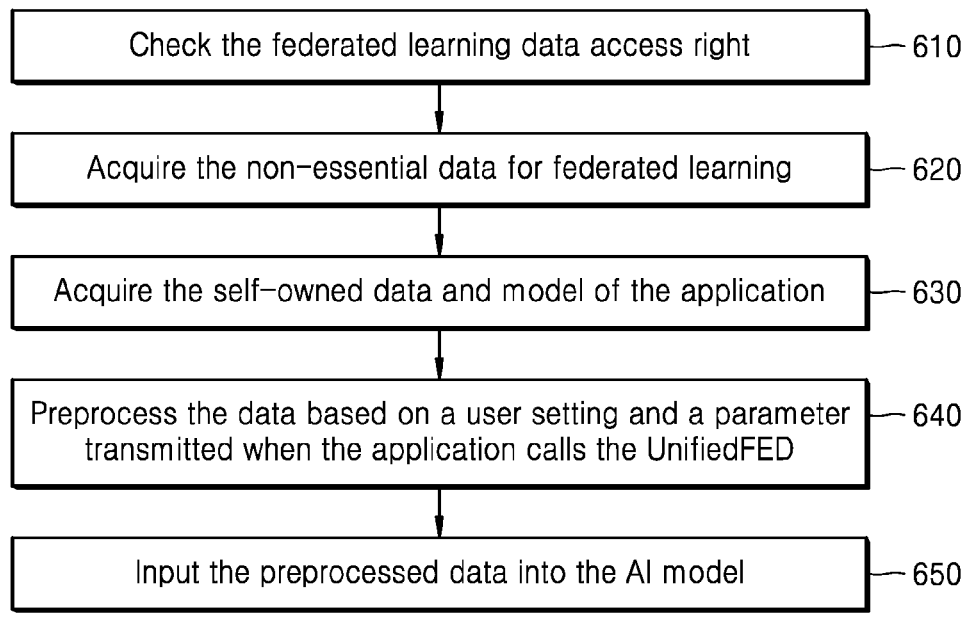
FIG. 6 is a schematic diagram of a process of performing data preprocessing by a preferred data preprocessing module according to an embodiment of the present disclosure.

FIG. 6 is a schematic diagram of a process of performing data preprocessing by a data processing module 437 according to embodiments of the present application. Referring to FIG. 6, the following steps are included.

In Operation 610, the federated learning data access right of the application is checked in the right management module 435, and Operation 620 is entered after the application passes the check.

In Operation 620, the UnifiedFED acquires the non-essential data only for federated learning, namely, the non-essential user data.

In Operation 630, the UnifiedFED acquires the self-owned data and model of the application.

In Operation 640, the data is preprocessed based on a user setting and a parameter transmitted when the application calls the UnifiedFED. The data may include the non-essential data (also referred as privacy data) and the self-owned data.

In Operation 650, the preprocessed data is input into the model for training or predicting, i.e., feeding the data to the model (i.e., providing the data to the model).

In the data preprocessing process described above, user privacy data is strictly independent of the application, the access to the user data and the model interaction are completed by the UnifiedFED, and the application is unaware of the content of the data, thereby achieving high security. Moreover, the user may also specify the granularity for exposing some privacy data through the user setting. For instance, the information of home address is only provided at a community level by default and is not accurate to a house number.

The application per se owns an AI model and data, and may transmit the AI model and data via a shared memory or in other forms to the UnifiedFED, which then provides the data to the model in a unified fashion.

Figure 7:
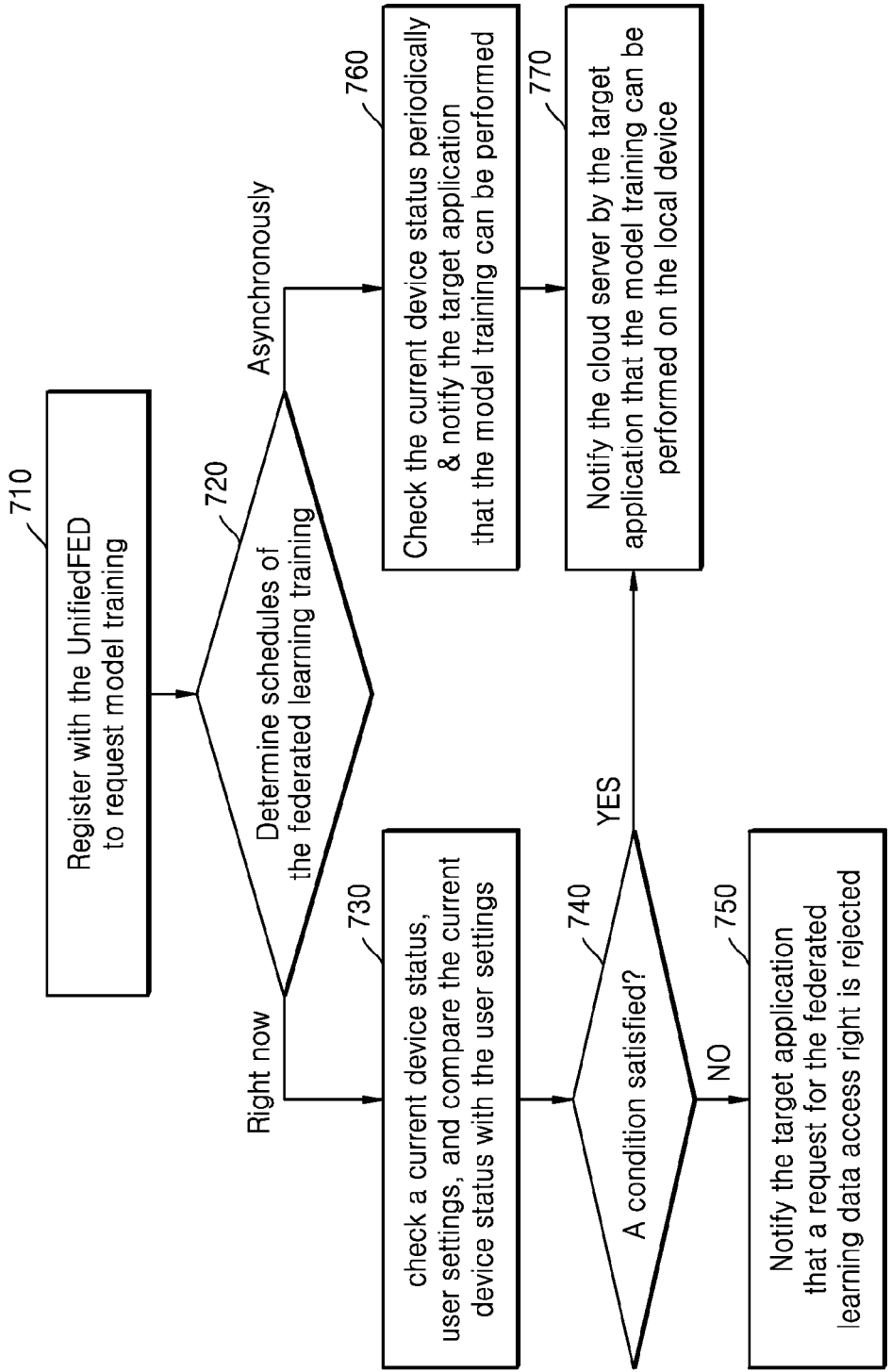
FIG. 7 is a schematic diagram of task scheduling performed by a preferred task scheduler.

FIG. 7 is a schematic diagram of task scheduling performed by a task scheduler 436. Before the UnifiedFED application provides the self-owned data to the AI model for the horizontal federated learning training, scheduling a training task may be executed by the UnifiedFED application. Referring to FIG. 7, the following steps are included.

In Operation 710, the application registers with the UnifiedFED to request model training. Each application registers with the UnifiedFED for federated learning tasks (i.e., for model training), which exist in the form of "task".

In Operation 720, UnifiedFED may determine schedules of the federated learning training. The schedules of the federated learning training may comprise executing a task of the federated learning training immediately and executing a task of the federated learning training asynchronously. If the task is executed immediately or asynchronously is determined, Operation 730 is performed continuously if the task is executed immediately, and Operation 760 is performed if the task is executed asynchronously.

In Operation 730, the task scheduler 436 may check a current device status, user settings, and compare the current device status with the user settings.

In Operation 740, the task scheduler 436 may determine whether a condition is satisfied based on the current device status and the user settings. If the current device status is determined not to meet a condition, Operation 770 is skipped, and Operation 750 is performed. If the current device status meets the condition, Operation 770 is performed.

The task scheduler 436 is responsible for scheduling the running of all the federated learning tasks. The task scheduler 436 when performing scheduling needs to determine if the current device status meets a condition, with the following factors taken into consideration: a task type, a model size, a number of parameters (e.g., neural network parameters, such as node weights and node connections) to be trained, a service condition of a device CPU/GPU/battery/network, a data volume to be trained, a user setting, etc.

The task type includes a predicting task and a training task, and the predicting task has a priority level higher than that of the training task.

The time required for training may be estimated based on the model size, the number of parameters, the device status and the like.

Model training is very resource-consuming, and a user may set some rules via the user setting. For instance, in order to reduce the network flow charge, the following setting may be made: training is only performed when WiFi is connected; in order to reduce power consumption, participating in the model training is only performed when the power is greater than a defined threshold, or in a charging state, or in a specified time period; and in order not to affect other applications, it may be specified that the model training is performed only when the device is idle.

The application may provide a material incentive to encourage a user to participate in the model training. The task scheduler 436 may also ensure the fairness among different users in terms of contribution, data quality and user benefits by a dedicated incentive mechanism module.

In Operation 750, the application is notified that the request is rejected, and then notifies the server to select another device to perform model training, and the process is ended then.

In Operation 760, the task scheduler 436 periodically checks the current device status, and notifies, when the current device status meets the condition, the registered application that the device is ready for model training.

In Operation 770, the application notifies a cloud server that the local device is capable of performing model training; and if the cloud server selects the local device, the model is downloaded to the local device from a cloud end, and then the training is started. Here, the step of downloading the model may be advanced and performed in Operation 710, 720, 730 and 760.

For the security check module 434, security is of the top priority for the federated learning, and in the technical solutions according to the present application, the security is first ensured independent of a Common Federated Learning Framework of the UnifiedFED. The Common Federated Learning Framework can defend against ordinary security attacks, which specifically include:

a. model extraction attacks, in which an attacker attempts to steal the parameters and hyper-parameters of the model to destroy the confidentiality of the model;
 b. model reversion attacks, in which the attacker attempts to acquire the information of a training dataset from a trained model to thereby acquire the privacy information of a user; and
 c. virus attacks, confrontation attacks, etc.

Based on this, the security check module 434 in the UnifiedFED is enhanced in terms of security, mainly including: expanding the security check for software package files (e.g., files in APK format) on the shelves in an App store and for local APKs, and performing security check on applications requesting the federated learning data access right and on AI models and codes intended for training and predicting. Security check methods for APKs have been studied and practiced in the industry.

Other modules are briefly illustrated as follows.

The incentive mechanism module 438 is configured to design a relatively fair benefit distribution solution to evaluate the contribution of each node during the model training, thereby ensuring the fairness among different users in terms of contribution, data quality and user benefit. For the specific solution for designing the incentive mechanism, there is some relevant research in the industry, and their details will not be repeated herein anymore. The status monitor 432 is configured to monitor and manage the tasks run by the UnifiedFED, and some of the tasks may be stopped manually. The application programming interface module 431 is configured to provide an application programing interface (API) to be called by the application. The federated learning framework layer interface module 439 is configured to interact with the Common Federated Learning Framework. The implementation of the technical solutions of the present application will be further illustrated in detail below in conjunction with the accompanying drawings and the specific embodiments.

Figure 8:
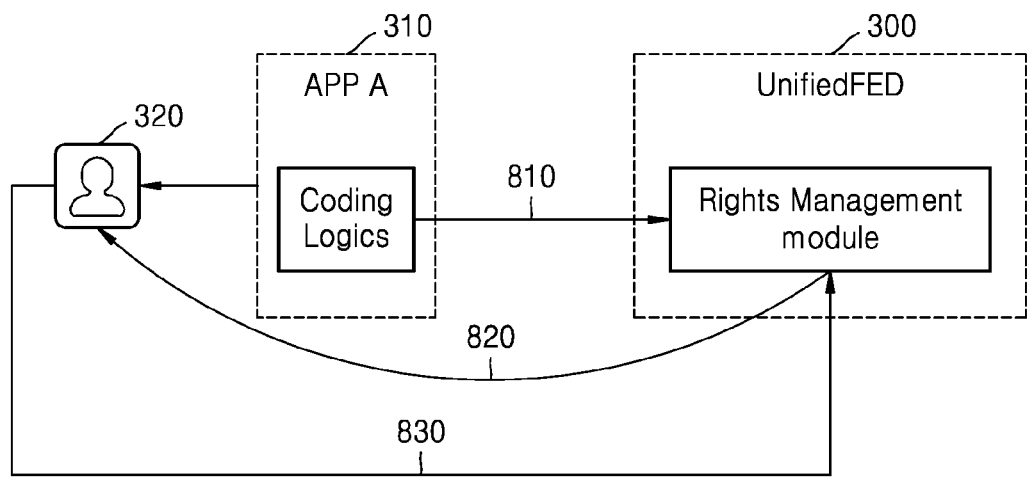
FIG. 8 is a schematic diagram of a process of requesting for a federated learning data access right by an application according to an embodiment of the present disclosure.

FIG. 8 illustrates a process of requesting a federated learning data access right by an application according to an embodiment. As shown in FIG. 8, the process includes the following steps.

In Operation 810, an application requests a specific federated learning data access right, and this request is received by a right management module in a UnifiedFED.

In Operation 820, the right management module 435 in the UnifiedFED pops up a user interface (UI) to request a user to provide a federated learning data access right, and the user may select not to authorize the right, to authorize the right once only, or to always allow to authorize the right.

In Operation 830, the user makes the selection of authorizing the right, and a user selection result is saved to the right management module 435.

A request for the right usually occurs when the application is installed in the form of APK and the like, or when the application runs to interact with the user.

The actual training process of the federated learning generally occurs when a system is idle. At this time, a user is less likely to look at a mobile phone, and thus will not respond to the right request from the application. Therefore, the application may not request the right by waiting until a training time.

Figure 9:
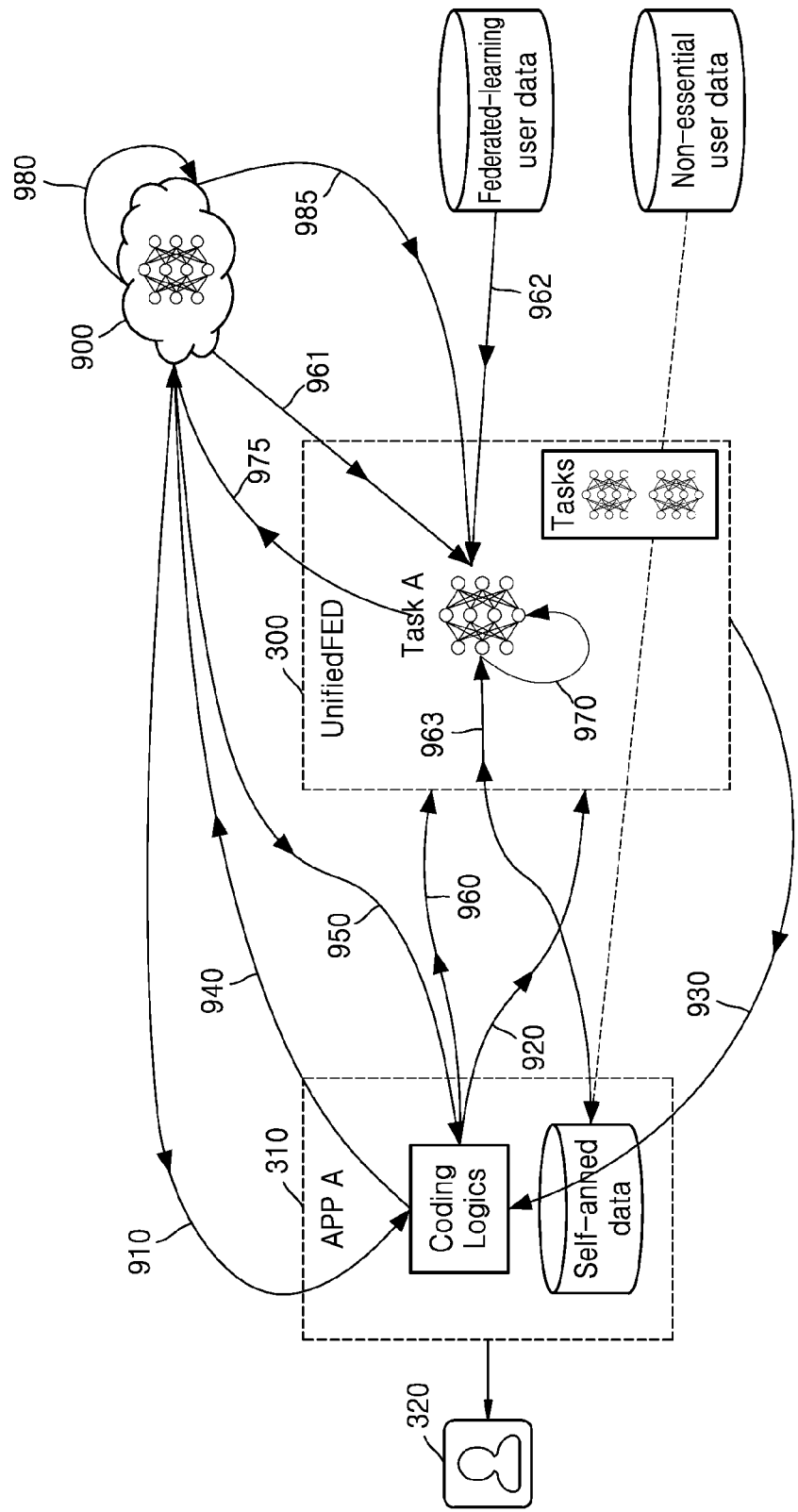
FIG. 9 is a schematic diagram of a model training process according to an embodiment of the present disclosure.

FIG. 9 is a schematic diagram of a model training process according to an embodiment of the present application. Referring to FIG. 9, the model training process includes the following steps.

In Operation 910, a cloud server 900 sends a request to the application A 310 to request model training.

In Operation 920, the application A 310 sends a request to the UnifiedFED 300 of a local device to query if it is ready for training.

In Operation 930 after the federated learning data access right of the application A 310 and the device status are checked, the task scheduler 436 notifies the UnifiedFED 300 that the preparation is made for training or the training cannot be performed.

In Operation 940, the application A 310 notifies the cloud server 900 that the preparation is made for the training.

In Operation 950, the cloud service 900 makes a selection from a candidate training device list and notifies the local device to participate in the training.

In Operation 960, the application A 310 calls an application programming interface module 431 of the UnifiedFED 300 to train the model and transmit parameters.

In Operation 961, the cloud server 900 shares the model in user devices.

In Operation 962, the UnifiedFED 300 acquires authorized federated learning user data.

In Operation 963, the self-owned data of the application A 310 is transmitted to the UnifiedFED 300.

Operation 961-963 described above may be performed simultaneously or in another order, without a distinction between priorities, In Operation 970, the training task is scheduled and executed.

In Operation 975, the UnifiedFED 300 sends a gradient to the cloud server.

In Operation 980, the cloud server 900 securely aggregates the training results returned by the respective devices.

In Operation 985, the cloud server 900 sends an updated model back to the UnifiedFED 300.

In the process shown in FIG. 9, the cloud server 900 undergoes a candidate device selection process before the model training. For example, the server may send a training request to 10,000 devices, 5,000 devices agree to the request, and finally, the server may only select 3,000 of the devices to participate in the model training.

The model training may be completed in one round or multiple rounds, therefore, Operation 975, 980 and 985 may be repeated multiple rounds.

Figure 10:
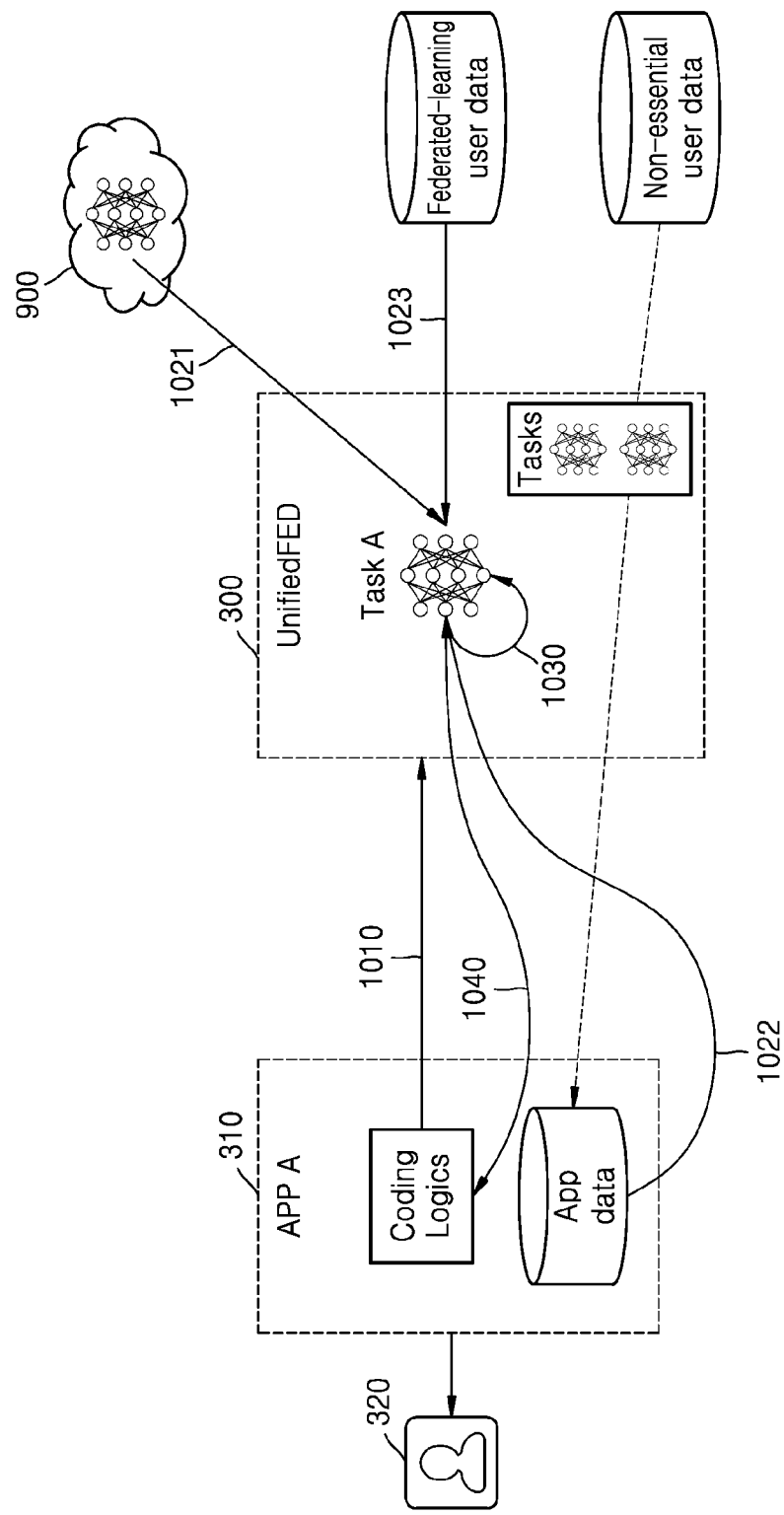
FIG. 10 is a schematic diagram of a predicting process according to an embodiment of the present disclosure.

FIG. 10 is a schematic diagram of a predicting process according to embodiments of the present application. Referring to FIG. 10, the following steps are included.

In Operation 1010, an application A 310 calls a UnifiedFED 300 API to acquire a specific model prediction result.

In Operation 1021, the UnifiedFED downloads the latest model from the cloud server if a local model needs to be updated. Considering that a long time is needed to download the model, the process of downloading the model in this step may be completed in advance during the running of the application by using a preloading mechanism, such that there is no need to download the model when it is to be used.

In Operation 1021, the application shares the self-owned data with the UnifiedFED.

In Operation 1023, the UnifiedFED acquires the authorized federated learning user data.

Operation 1021-Operation 1023 described above may be performed simultaneously or in another order, without a distinction between priorities, In Operation 1030, the model predicting task of the application A 310 is scheduled and executed, and a result is returned after the execution is completed.

In Operation 1040, the UnifiedFED 300 returns a predicting result to the application A 310.

Since the result needs to be obtained immediately during the model predicting, the model predicting task has the highest priority. If another model is being trained and occupies resources at this time, said another model will be paused or suspended.

Examples of application scenarios of the technical solutions of the present application are listed as follows:

Application Scenario I:

According to an embodiment of the disclosure, a user allows an application A to use a federated learning data access right of some non-essential user data for running the application, and the application A combines self-owned data and non-essential user data to obtain a better AI model by training.

Figure 11:
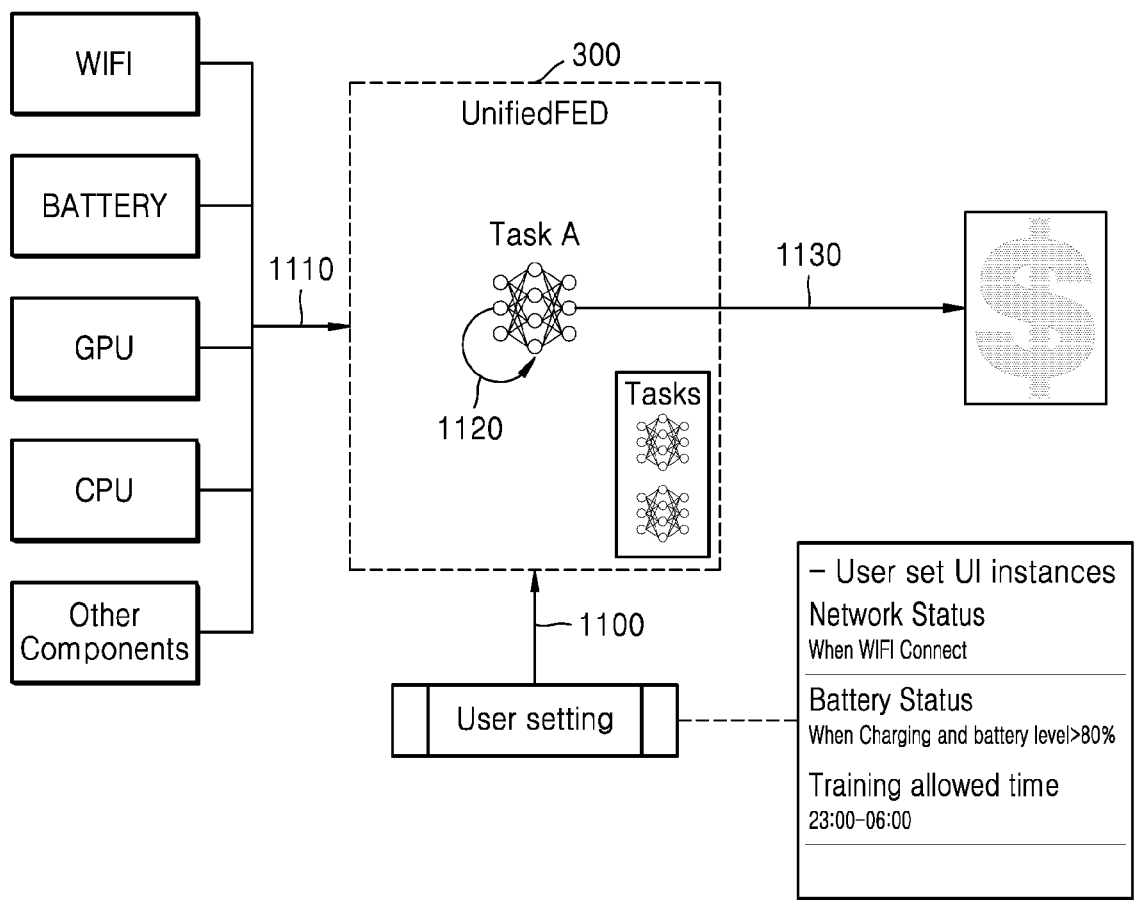
FIG. 11 is a schematic diagram of an application scene according to an embodiment of the present disclosure.

Application Scenario II:

FIG. 11 is a schematic diagram of a typical application scene of the present disclosure. Referring to FIG. 11, the following steps are included.

In Operation 1100, a UnifiedFED 300 reads a user setting. For example, an example of the user setting is as follows: the network condition is set to be running only when WiFi is connected: the battery condition is set to be available during charging or when a battery level is more than a preset battery level (e.g., 80%); and the allowed time range for training is set to be 23:00-06:00.

In Operation 1110, the UnifiedFED 300 monitors a service condition of a system CPU/GPU/battery/network. In more detail, the UnifiedFED 300 may monitor whether connected by WIFI, battery, GPU, CPU and other components.

In Operation 1120, the UnifiedFED schedules all federated learning tasks based on the user setting and the service condition of the system CPU/GPU/battery/network, so as to ensure to complete the training task for a federated learning model without interfering with the user's normal use of the device.

In Operation 1130, after the device completes the training, a contribution is evaluated and a proper incentive is given.

Figure 12:
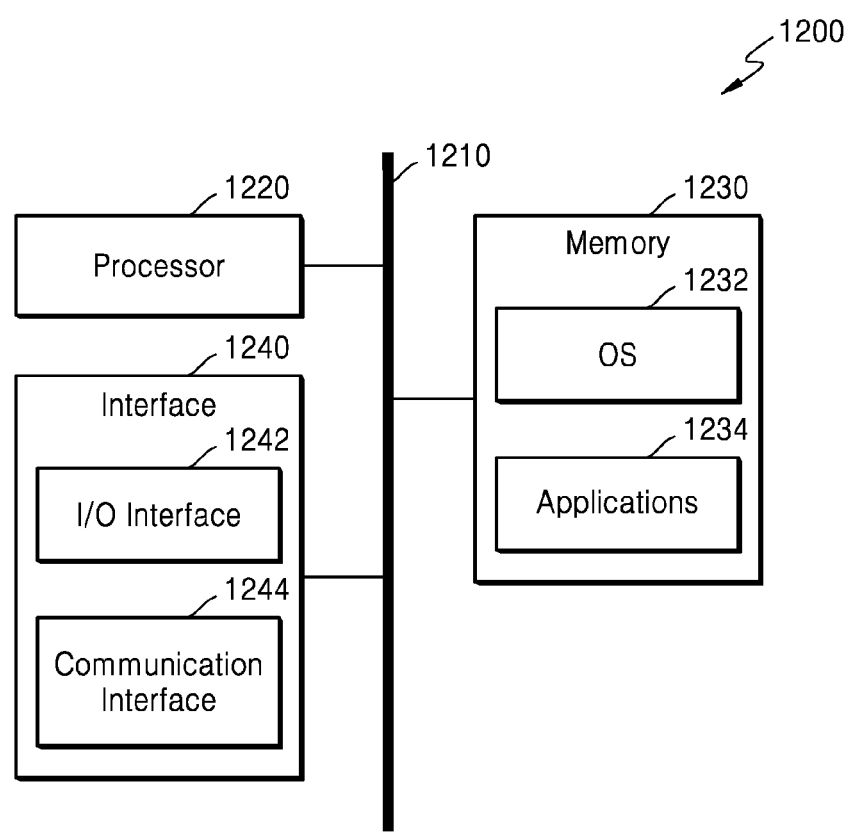
FIG. 12 is a block diagram of an electronic device in which a predicting process and a training process are implemented, according to embodiments.

FIG. 12 is a block diagram of an electronic device 1200 in which a predicting process and a training process are implemented, according to embodiments.

FIG. 12 is for illustration only, and other embodiments of the electronic device 1200 could be used without departing from the scope of this disclosure.

The electronic device 1200 includes a bus 1210, a processor 1220, a memory 1230, and a communication interface 1240.

The bus 1210 includes a circuit for connecting the components 1220 to 1240 with one another. The bus 1210 functions as a communication system for transferring data between the components 1020 to 1050 or between electronic devices.

The processor 1220 includes one or more of a central processing unit (CPU), a graphics processor unit (GPU), an accelerated processing unit (APU), a many integrated core (MIC), a field-programmable gate array (FPGA), or a digital signal processor (DSP). The processor 1220 is able to perform control of any one or any combination of the other components of the electronic device 1200, and/or perform an operation or data processing relating to communication. For example, the processor 1220 performs a unified federated learning service and a horizontal federated learning process according to embodiments of the present disclosure.

The memory 1230 may include a volatile and/or non-volatile memory. The memory 1230 stores information, such as one or more of commands, data, programs (one or more instructions), applications 1234, etc., which are related to at least one other component of the electronic device 1200 and for driving and controlling the electronic device 1200. For example, commands and/or data may formulate an operating system (OS) 1232. Information stored in the memory 1230 may be executed by the processor 1220.

The applications 1234 include the above-discussed embodiments. These functions can be performed by a single application or by multiple applications that each carry out one or more of these functions. For example, the applications 1234 may include an artificial intelligence (AI) model for performing a unified federated learning service and a horizontal federated learning process according to embodiments of the present disclosure.

The communication interface 1240 includes input/output (I/O) interface 1242 and communication interface 1244. The I/O interface 1242 serves as an interface that can, for example, transfer commands and/or data between a user and/or other external devices and other component(s) of the electronic device 1200.

The communication interface 1244, for example, is able to set up communication between the electronic device 1200 and an external electronic device. The communication interface 1244 can be connected with a network through wireless or wired communication architecture to communicate with the external electronic device. The communication interface 1244 can be a wired or wireless transceiver or any other component for transmitting and receiving signals.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical disk storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium

What is claimed is:

1. A method for performing federated learning, comprising:

requesting, by a target application, a user to provide a federated learning data access right to access privacy data, wherein the federated learning data access right is a right set specific to the federated learning, under the federated learning data access right, a privacy data access and an artificial intelligence (AI) model interaction are completed by a unified federated learning service (UnifiedFED) application and the target application cannot acquire a content of the privacy data;
calling, by the target application, the UnifiedFED application to perform federated learning,
acquiring, by the UnifiedFED application, the privacy data isolated from the target application according to the federated learning data access right only for the federated learning,
receiving, by the UnifiedFED application, non-privacy data from the target application, and
providing, by the UnifiedFED application, the privacy data and the non-privacy data to the AI model for federated learning training,
wherein the privacy data is accessed only by the UnifiedFED application, and not by the target application requesting access to the privacy data and directly transmitted to the UnifiedFED application without going through the target application.

2. The method as claimed in claim 1, wherein the acquiring of the privacy data comprises:
in response to the target application about the federated learning data access right, identifying a type of the federated learning data access right; and
acquiring the privacy data based on the identified type.

3. The method as claimed in claim 2, the method further comprises:
identifying the type of the federated learning data access right as being allowed to have the federated learning data access right only at a current time; and
acquiring the privacy data based on the identified type.

4. The method as claimed in claim 2, the method further comprises:
identifying the type of the federated learning data access right as being allowed to have the federated learning data access at all times, authorizing the federated learning data access right to the target application, and
acquiring the privacy data based on the identified type.

5. The method as claimed in claim 2, the method further comprises:
identifying the type of the federated learning data access right as not being allowed to have the federated learning data access at all times; and
rejecting the target application to obtain the federated learning data access right.

6. The method as claimed in claim 1, wherein the method further comprises:
acquiring, by the UnifiedFED application, self-owned data of the target application, and
preprocessing the self-owned data based on a user setting and a parameter that is transmitted when the target application calls the UnifiedFED application to acquire the preprocessed data that is input into the AI model.

7. The method according to claim 1, wherein the method further comprises:
determining, by the UnifiedFED application, schedules of the federated learning training as executing a task of the federated learning training immediately;
when a current device status meets a condition notifying the target application that model training can be performed, notifying a cloud server by the target application that the model training can be performed on a local device, and downloading the model when the local device is chosen by the cloud server or in advance; and
when the current device status does not meet the condition notifying the target application that a request for the federated learning data access right is rejected, and notifying, by the target application, the cloud server to choose another device to perform the model training.

8. The method as claimed in claim 1, wherein the method further comprises:
determining, by the UnifiedFED application, schedules of the federated learning training as executing a task of the federated learning training asynchronously;
periodically checking a current device status,
when the current device status meets a condition, notifying the target application that the model training can be performed, notifying a cloud server by the target application that the model training can be performed on a local device, and downloading the model when the local device is chosen by the cloud server or in advance.

9. The method as claimed in claim 7, wherein the UnifiedFED application determines if the current device status meets the condition based on at least one of a task type, a model size, a number of neural network parameters to be trained, a service condition of a processor, a battery, or a network of a device that performs the method, a data volume to be trained, and a user setting,
wherein the task type comprises a predicting task and a training task, with the predicting task having a priority level higher than that of the training task; and
the model size, the number of neural network parameters to be trained, and the data volume to be trained are used to estimate a time required for training.

10. The method as claimed in claim 1, further comprises:
transmitting, by the UnifiedFED application, a gradient to a cloud server; and
receiving, by the UnifiedFED application, updated AI model from the cloud server.

11. An apparatus for federated learning, the apparatus comprising:
a memory storing one or more instructions; and
at least one processor configured to execute the one or more instructions to:
determine, when receiving scheduling from a target application, if the target application has a federated learning data access right to access privacy data, wherein the federated learning data access right is a right set specific to the federated learning, under the federated learning data access right, a privacy data access and an artificial intelligence (AI) model interaction are completed by a unified federated learning service (UnifiedFED) application and the target application cannot acquire a content of the privacy data; and
in response to determining that the target application has the federated learning data access right to access the privacy data, acquire the privacy data that is isolated from the target application only for the federated learning, receive non-privacy data from the target application, and
provide the privacy data and the non-privacy data to the AI model to perform federated learning training,
wherein the privacy data is acquired only by the UnifiedFED application, and not by the target application having the federated learning data access right and directly transmitted to the UnifiedFED application without going through the target application.

12. The apparatus as claimed in claim 11, wherein the at least one processor is further configured to execute the one or more instructions to:
in response to the target application about the federated learning data access right, identify a type of the federated learning data access right; and acquire the privacy data based on the identified type.

13. The apparatus as claimed in claim 11, wherein the at least one processor is further configured to preprocess user data based on a user configuration and a parameter that are transmitted when the target application calls the UnifiedFED application to acquire the preprocessed data that is input into the AI model, and the user data comprises the privacy data and self-owned data of the target application.

14. The apparatus as claimed in claim 11, wherein the at least one processor is further configured to:
   determine schedules of the federated learning training as executing a task of the federated learning training asynchronously;
   periodically check a current device status; and
   when the current device status meets a condition, notify the target application that the model training can be performed, and download the model when a local device is chosen by a cloud server or in advance.

15. The apparatus as claimed in claim 12, wherein the at least one processor is further configured to:
   identify the type of the federated learning data access right as being allowed to have the federated learning data access right only at a current time; and
   acquire the privacy data based on the identified type.

16. The apparatus as claimed in claim 12, wherein the at least one processor is further configured to:
   identify the type of the federated learning data access right as being allowed to have the federated learning data access at all times, authorizing the federated learning data access right to the target application, and
   acquire the privacy data based on the identified type.

17. The apparatus as claimed in claim 12, wherein the at least one processor is further configured to:
   identify the type of the federated learning data access right as not being allowed to have the federated learning data access at all times; and
   reject the target application to obtain the federated learning data access right.

18. The apparatus as claimed in claim 11, wherein the at least one processor is further configured to:
   acquire self-owned data of the target application, and
   preprocess the self-owned data based on a user setting and a parameter that is transmitted when the target application calls the UnifiedFED application to acquire the preprocessed data that is input into the AI model.

19. The apparatus as claimed in claim 11, wherein the at least one processor is further configured to:
   transmit a gradient to a cloud server; and
   receive updated AI model from the cloud server.

20. A computer-readable storage medium, having a computer program stored thereon that performs, when executed by a processor, the method according to claim 1.

* * * * *